US008873535B2

(12) United States Patent
Arulprakasam et al.

(10) Patent No.: US 8,873,535 B2
(45) Date of Patent: Oct. 28, 2014

(54) SYSTEMS, METHODS AND APPARATUS FOR RETRANSMITTING PROTOCOL DATA UNITS IN WIRELESS COMMUNICATIONS

(75) Inventors: Rajasekar Arulprakasam, San Diego, CA (US); Sitaramanjaneyulu Kanamarlapudi, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 104 days.

(21) Appl. No.: 13/539,190

(22) Filed: Jun. 29, 2012

(65) Prior Publication Data

US 2013/0077616 A1 Mar. 28, 2013

Related U.S. Application Data

(60) Provisional application No. 61/539,412, filed on Sep. 26, 2011.

(51) Int. Cl.
*H04J 3/16* (2006.01)
*H04L 1/18* (2006.01)
*H04L 1/16* (2006.01)

(52) U.S. Cl.
CPC ............ *H04L 1/1685* (2013.01); *H04L 1/1896* (2013.01); *H04L 1/1867* (2013.01); *H04L 1/188* (2013.01)
USPC .......................................... 370/346; 370/394

(58) Field of Classification Search
CPC ................ H04W 72/1263; H04W 72/1278; H04L 1/1854; H04L 47/36; H04L 1/1803–1/1819; H04L 1/1848
USPC ............ 370/236, 312, 346, 449, 394; 455/39, 455/502; 714/748–749
See application file for complete search history.

(56) References Cited

U.S. PATENT DOCUMENTS 7,379,478 B1    5/2008 Mantha
7,751,320 B2    7/2010 Nuzman et al.
(Continued)

FOREIGN PATENT DOCUMENTS

EP    1263160 A1  *  12/2002
EP    1465371 A1    10/2004
(Continued)

OTHER PUBLICATIONS

3GPP TS 25.321 V10.3.0 (Jun. 2011), 3rd Generation Partnership Project; Technical Specification Group Radio Access Network; Medium Access Control (MAC) protocol specification (Release 10), 198 pages.

(Continued)

*Primary Examiner* — Jeffrey M Rutkowski
*Assistant Examiner* — Romani Ohri
(74) *Attorney, Agent, or Firm* — Abdollah Katbab

(57) ABSTRACT

Systems, devices, and methods for retransmitting protocol data units in wireless communication are provided. In one aspect, a device configured to communicate via a wireless communication link includes a processor. The processor is configured to transmit a plurality of protocol data units (PDUs) to a receiving device, select a first PDU from a set of PDUs that has not been acknowledged by the receiving device, retransmit the first selected PDU with a first poll indicator, select a second PDU from the set, and retransmit the second selected PDU with a second poll indicator. The second PDU is different than the first PDU. In some aspects, the PDUs are selected based on the PDUs' original transmission time. In other aspects, the PDUs may be selected based on the PDU's most recent transmission time.

40 Claims, 5 Drawing Sheets

(56) References Cited

U.S. PATENT DOCUMENTS

| | | | |
|---|---|---|---|
| 8,041,375 B2 | 10/2011 | Laroia et al. | |
| 8,620,337 B2 | 12/2013 | Meredith et al. | |
| 2003/0021262 A1 | 1/2003 | Ma et al. | |
| 2005/0180449 A1 | 8/2005 | Ranta-Aho et al. | |
| 2006/0154603 A1* | 7/2006 | Sachs et al. | 455/39 |
| 2006/0195727 A1 | 8/2006 | Yoshitsugu et al. | |
| 2006/0291395 A1 | 12/2006 | Ketonen et al. | |
| 2008/0130584 A1 | 6/2008 | Pani et al. | |
| 2008/0132268 A1 | 6/2008 | Choi-Grogan et al. | |
| 2008/0144598 A1* | 6/2008 | Jiang | 370/346 |
| 2008/0194282 A1 | 8/2008 | Nibe et al. | |
| 2008/0226074 A1 | 9/2008 | Sammour et al. | |
| 2009/0104901 A1 | 4/2009 | Baker et al. | |
| 2009/0135773 A1 | 5/2009 | Aghili et al. | |
| 2009/0161545 A1 | 6/2009 | Ho et al. | |
| 2009/0175175 A1 | 7/2009 | Somasundaram et al. | |
| 2010/0008302 A1 | 1/2010 | Sayers et al. | |
| 2010/0034114 A1 | 2/2010 | Kim et al. | |
| 2010/0091723 A1 | 4/2010 | Park et al. | |
| 2010/0113006 A1 | 5/2010 | Pajjuri et al. | |
| 2010/0144363 A1 | 6/2010 | De Rosa et al. | |
| 2010/0165901 A1 | 7/2010 | Kim | |
| 2010/0195519 A1 | 8/2010 | Ji | |
| 2010/0220615 A1 | 9/2010 | Enstrom et al. | |
| 2010/0260049 A1 | 10/2010 | Racz et al. | |
| 2010/0278341 A1 | 11/2010 | Kubota | |
| 2010/0316040 A1 | 12/2010 | Kim et al. | |
| 2011/0009073 A1 | 1/2011 | Burbidge et al. | |
| 2011/0019756 A1 | 1/2011 | Chun et al. | |
| 2011/0149787 A1 | 6/2011 | Digirolamo et al. | |
| 2011/0158140 A1 | 6/2011 | Asokan | |
| 2011/0158194 A1 | 6/2011 | Musikka et al. | |
| 2011/0179329 A1 | 7/2011 | Kim et al. | |
| 2011/0194479 A1* | 8/2011 | Jin et al. | 370/312 |
| 2011/0249563 A1 | 10/2011 | Provvedi et al. | |
| 2011/0268088 A1 | 11/2011 | Lindskog et al. | |
| 2011/0269463 A1 | 11/2011 | Wang et al. | |
| 2011/0286387 A1 | 11/2011 | Sane et al. | |
| 2012/0002541 A1 | 1/2012 | Lee et al. | |
| 2012/0009930 A1 | 1/2012 | Brisebois et al. | |
| 2012/0020286 A1 | 1/2012 | Damnjanovic et al. | |
| 2012/0026921 A1 | 2/2012 | Choi | |
| 2012/0064908 A1 | 3/2012 | Fox et al. | |
| 2012/0082096 A1 | 4/2012 | Cave et al. | |
| 2012/0083264 A1 | 4/2012 | Ramasamy et al. | |
| 2012/0093110 A1 | 4/2012 | Somasundaram et al. | |
| 2012/0178438 A1 | 7/2012 | Vashi et al. | |
| 2012/0201134 A1 | 8/2012 | Wang et al. | |
| 2012/0269148 A1 | 10/2012 | Hultell et al. | |
| 2013/0003542 A1 | 1/2013 | Catovic et al. | |
| 2013/0003631 A1 | 1/2013 | Catovic et al. | |
| 2013/0021915 A1 | 1/2013 | Catovic et al. | |
| 2013/0033990 A1 | 2/2013 | Catovic et al. | |
| 2013/0064098 A1 | 3/2013 | El-Saidny et al. | |
| 2013/0148499 A1 | 6/2013 | Racz et al. | |
| 2014/0133323 A9 | 5/2014 | Guarino | |

FOREIGN PATENT DOCUMENTS

| | | |
|---|---|---|
| EP | 1653758 A1 | 5/2006 |
| EP | 1768296 A2 | 3/2007 |
| EP | 1811690 A1 | 7/2007 |
| EP | 1956728 A2 | 8/2008 |
| EP | 2256996 A1 | 12/2010 |
| EP | 2317815 A1 | 5/2011 |
| WO | 0038368 A1 | 6/2000 |
| WO | 0122645 A1 | 3/2001 |
| WO | 0193513 A2 | 12/2001 |
| WO | 2005112500 A1 | 11/2005 |
| WO | 2008097544 A2 | 8/2008 |
| WO | 2010088295 A1 | 8/2010 |
| WO | 2011025438 A1 | 3/2011 |
| WO | 2011072735 A1 | 6/2011 |

OTHER PUBLICATIONS

3GPP TS 25.331 V10.3.1, "3rd Generation Partnership Project; Technical Specification Group Radio Access Network; Radio Resource Control (RRC); Protocol Specification (Release 10)" (Apr. 2011).

Brunner, et al., "Inter-System Handover Parameter Optimization," 2006 IEEE 64th Vehicular Technology Conference, pp. 1-6.

International Search Report and Written Opinion—PCT/US2012/045330—ISA/EPO—Oct. 26, 2012.

Siemens: "Contribution to Power Limit Problem in HSDPA Case", 3GPP Draft; R2-040981, 3rd Generation Partnership Project (3GPP), Mobile Competence Centre ; 650, Route des Lucioles ; F-06921 Sophia-Antipolis Cedex ; France, vol. RAN WG2, No. Montreal, Canada; May 17, 2004, XP050125851.

Xu, et al., "Performance Analysis on the Radio Link Control Protocol of UMTS System," Proceedings from 2002 IEEE 56th Vehicular Technology Conference, vol. 4, pp. 2026-2030.

* cited by examiner

SYSTEMS, METHODS AND APPARATUS FOR RETRANSMITTING PROTOCOL DATA UNITS IN WIRELESS COMMUNICATIONS

CROSS-REFERENCE TO RELATED APPLICATIONS

The disclosure claims priority to U.S. Provisional Patent Application No. 61/539,412 filed Sep. 26, 2011, entitled "SYSTEMS, METHODS AND APPARATUS FOR RETRANSMITTING PROTOCOL DATA UNITS IN WIRELESS COMMUNICATIONS" and assigned to the assignee hereof. The disclosure of this prior application is considered part of, and is incorporated by reference in, this disclosure.

FIELD

Aspects of the present invention relate to wireless communication, and in particular, to systems, method and apparatus for retransmitting protocol data units (PDUs) in wireless communications.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals (e.g. cellphones, tablet computers and other electronic devices). Each wireless terminal communicates with one or more base stations via transmissions on one or more uplinks and downlinks. A downlink (or forward link) refers to the communication link from the base stations to the wireless terminal, and an uplink (or reverse link) refers to the communication link from the wireless terminal to the base station. These communication links may be established via a single-in-single-out (SISO), multiple-in-single-out (MISO), or a multiple-in-multiple-out (MIMO) system.

A MIMO system employs multiple transmit antennas and multiple receive antennas for data transmission. A MIMO channel formed by the transmit and receive antennas may be decomposed into independent channels, which are also referred to as spatial channels. Each of the independent channels corresponds to a dimension. The MIMO system can provide improved performance (e.g., higher throughput and/or greater reliability) if the additional dimensions created by the multiple transmit and receive antennas are utilized.

A MIMO system supports time division duplex (TDD) and frequency division duplex (FDD) systems. In a TDD system, the uplink and downlink transmissions are within the same frequency region so that the reciprocity principle allows the estimation of the downlink channel from the uplink channel. This enables the base station to extract transmit beamforming gain on the downlink when multiple antennas are available at the base station.

The primary purpose of the base station is to provide connectivity between a wireless terminal or terminals and the core communications network. In a UMTS radio access network (RAN), the functionalities of a base station may be split across two network elements: the Radio Network Controller (RNC) handles, among other functions, connection setup, resource assignment and mobility; the base node (NodeB) configured to handle the radio transmission and reception to and from wireless terminals as well as the resource allocation for connected users on the shared channels.

To establish a call connection between a wireless terminal and a base station, a Radio Access Bearer (RAB) is needed. The RAB carries voice or other data between the wireless terminal and the core communication network. When packets are transmitted across a wireless network, it may be necessary for the receiving device to send acknowledgement messages to the sender. Once an acknowledgement message is received by a wireless terminal, that message may no longer be retransmitted by the wireless terminal.

A wireless terminal may determine the receive status of previously transmitted messages from a receiver. A poll request may be sent from the wireless terminal to the intended receiver. In response, the intended receiver may send a message to the wireless terminal indicating a list of received and not received messages. Currently, the poll request provides an opportunity to send a PDU to the intended receiver. Currently, this opportunity is typically used to send the most recently transmitted PDU to the intended receiver. However, this may not realize the full potential retransmission benefit when sending a poll. Accordingly, there is an opportunity to improve the utility of retransmission polling on wireless networks.

SUMMARY

Various implementations of systems, methods and apparatus within the scope of the appended claims each have several aspects, no single one of which is solely responsible for the desirable attributes described herein. Without limiting the scope of the appended claims, some prominent features are described herein. After considering this discussion, and particularly after reading the section entitled "Detailed Description" one will understand how the features of various implementations are used to retransmit protocol data units in a wireless terminal.

In one aspect, a device configured to communicate via a wireless communication link is provided. The device includes a processor. The processor is configured to transmit a plurality of protocol data units (PDUs) to a receiving device, select a first PDU from a set of PDUs that has not been acknowledged by the receiving device, retransmit the first selected PDU with a first poll indicator, select a second PDU from the set, and retransmit the second selected PDU with a second poll indicator. The second PDU is different than the first PDU. In some aspects, the PDUs are selected based on the PDUs' original transmission time. In other aspects, the PDUs may be selected based on the PDUs' most recent transmission time.

In some aspects, the processor may be further configured to order the set of unacknowledged PDUs, select the first PDU based on the ordered set and a PDU index, alter the PDU index, and select the second PDU based on the ordered set and the altered PDU index. In some of these aspects, the unacknowledged PDUs are ordered from least recent transmission time to most recent transmission time, and altering the PDU index includes incrementing the PDU index. In some other aspects, the unacknowledged PDUs are ordered from most recent transmission time to least recent transmission time, and altering the PDU index includes decrementing the PDU index. In yet other aspects the unacknowledged PDUs are randomly ordered.

In some aspects, the selecting of a PDU is in response to the expiration of a timer. In some aspects, the transmitting of a PDU is in response to the expiration of a timer. In some aspects, the processor is further configured to transmit a second plurality of PDUs to the receiving device, and add the second plurality of PDUs to the set of PDUs that has not been acknowledged by the receiving device. At least one of the first and second poll indicators includes a bit in a packet header field in some aspects. In some aspects, the wireless communication link includes a universal mobile telecommunications system. In some other aspects, the wireless communication link includes a 3G system.

In another aspect, a method of wireless communication is provided. The method includes transmitting a plurality of protocol data units (PDUs) to a receiving device, selecting a first PDU from a set of PDUs that has not been acknowledged by the receiving device, retransmitting the first selected PDU with a first poll indicator, select a second PDU from the set, and retransmitting the second selected PDU with a second poll indicator. The second PDU is different than the first PDU. In some aspects, the PDUs are selected based on the PDUs' original transmission time. In other aspects, the PDUs may be selected based on the PDUs' most recent transmission time.

In some aspects, the method may further include ordering the set of unacknowledged PDUs, selecting the first PDU based on the ordered set and a PDU index, altering the PDU index, and selecting the second PDU based on the ordered set and the altered PDU index. In some of these aspects, the unacknowledged PDUs are ordered from least recent transmission time to most recent transmission time, and altering the PDU index includes incrementing the PDU index. In some other aspects, the unacknowledged PDUs are ordered from most recent transmission time to least recent transmission time, and altering the PDU index includes decrementing the PDU index. In yet other aspects the unacknowledged PDUs are randomly ordered.

In some aspects, the selecting of a PDU is in response to the expiration of a timer. In some aspects, the transmitting of a PDU is in response to the expiration of a timer. In some aspects, the method further includes transmitting a second plurality of PDUs to the receiving device, and adding the second plurality of PDUs to the set of PDUs that has not been acknowledged by the receiving device. At least one of the first and second poll indicators includes a bit in a packet header field in some aspects. In some aspects, the wireless communication link includes a universal mobile telecommunications system. In some other aspects, the wireless communication link includes a 3G system.

In yet another aspect, another device configured to communicate via a wireless communication link is provided. The device includes means for transmitting a plurality of protocol data units (PDUs) to a receiving device, means for selecting a first PDU from a set of PDUs that has not been acknowledged by the receiving device, means for retransmitting the first selected PDU with a first poll indicator, means for selecting a second PDU from the set, and means for retransmitting the second selected PDU with a second poll indicator. The second PDU is different than the first PDU. In some aspects, the PDUs are selected based on the PDUs' original transmission time. In other aspects, the PDUs may be selected based on the PDUs' most recent transmission time.

In some aspects, the means for selecting the PDUs may order the set of unacknowledged PDUs, select the first PDU based on the ordered set and a PDU index, alter the PDU index. The means for selecting may also select the second PDU based on the ordered set and the altered PDU index. In some of these aspects, the unacknowledged PDUs are ordered from least recent transmission time to most recent transmission time, and altering the PDU index includes incrementing the PDU index. In some other aspects, the unacknowledged PDUs are ordered from most recent transmission time to least recent transmission time, and altering the PDU index includes decrementing the PDU index. In yet other aspects the unacknowledged PDUs are randomly ordered.

In some aspects, the selecting of a PDU is in response to the expiration of a timer. In some aspects, the transmitting of a PDU is in response to the expiration of a timer. In some aspects, the method further includes transmitting a second plurality of PDUs to the receiving device, and adding the second plurality of PDUs to the set of PDUs that has not been acknowledged by the receiving device. At least one of the first and second poll indicators includes a bit in a packet header field in some aspects.

In another aspect, a computer readable storage medium including instructions is provided. The instructions, when executed by a processor of an apparatus, cause the apparatus to transmit a plurality of protocol data units (PDUs) to a receiving device, select a first PDU from a set of PDUs that has not been acknowledged by the receiving device, retransmit the first selected PDU with a first poll indicator, select a second PDU from the set, and retransmit the second selected PDU with a second poll indicator. The second PDU is different than the first PDU. In some aspects, the PDUs are selected based on the PDUs' original transmission time. In other aspects, the PDUs may be selected based on the PDUs' most recent transmission time.

In some aspects, the computer readable medium may further include instructions, that when executed by a processor of an apparatus, cause the apparatus to order the set of unacknowledged PDUs, select the first PDU based on the ordered set and a PDU index, alter the PDU index, and select the second PDU based on the ordered set and the altered PDU index. In some of these aspects, the unacknowledged PDUs are ordered from least recent transmission time to most recent transmission time, and altering the PDU index includes incrementing the PDU index. In some other aspects, the unacknowledged PDUs are ordered from most recent transmission time to least recent transmission time, and altering the PDU index includes decrementing the PDU index. In yet other aspects the unacknowledged PDUs are randomly ordered.

In some aspects, the selecting of a PDU is in response to the expiration of a timer. In some aspects, the transmitting of a PDU is in response to the expiration of a timer. In some aspects, the method further includes transmitting a second plurality of PDUs to the receiving device, and adding the second plurality of PDUs to the set of PDUs that has not been acknowledged by the receiving device. At least one of the first and second poll indicators includes a bit in a packet header field in some aspects.

BRIEF DESCRIPTION OF THE DRAWINGS

So that the manner in which features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

Figure 1:
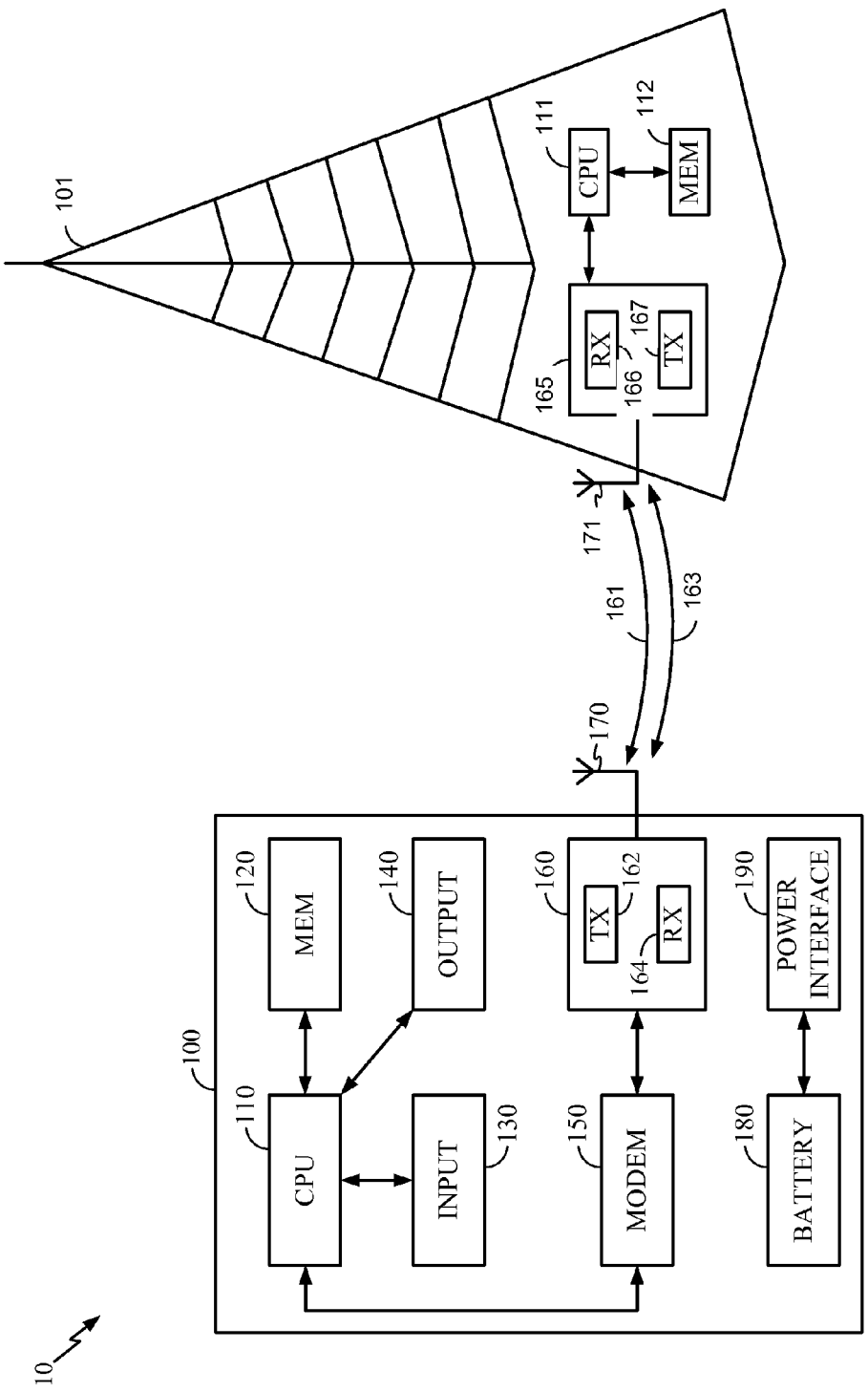
FIG. 1 shows an exemplary functional block diagram of a wireless communication system.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Various aspects of implementations within the scope of the appended claims are described below. It should be apparent that the aspects described herein may be implemented in a wide variety of forms and that any specific structure and/or function described herein is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, IEEE 802.22, Flash-OFDMA, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). Similarly, cdma2000 is described in documents from an organization named "3rd Generation Partnership Project 2" (3 GPP2).

In some aspects the teachings herein may be employed in a network that includes macro scale coverage (e.g., a large area cellular network such as a 3G network, typically referred to as a macro cell network) and smaller scale coverage (e.g., a residence-based or building-based network environment). As a wireless terminal (WT) or user equipment (UE) moves through such a network, the wireless terminal may be served in certain locations by base stations (BSs) or access nodes (ANs) that provide macro coverage while the wireless terminal may be served at other locations by access nodes that provide smaller scale coverage, e.g. femto nodes (FNs). In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

A cell associated with a macro node, a femto node, or a pico node may be referred to as a macro cell, a femto cell, or a pico cell, respectively. In some implementations, each cell may be further associated with (e.g., divided into) one or more sectors.

In various applications, other terminology may be used to reference a macro node, a femto node, or a pico node. For example, a macro node may be configured or referred to as an access node, access point, base station, Node B, eNodeB, macro cell, and so on. Also, a femto node may be configured or referred to as a Home NodeB (HNB), Home eNodeB (HeNB), access point access point, femto cell, and so on.

FIG. 1 shows an exemplary functional block diagram of a wireless communication system. The wireless communication system 10 may include at least one wireless terminal 100 and at least one base station 101 configured to communicate with each other over a first communication link 161 and a second communication link 163. Each of the first and second communication links 161, 163 can be a single-packet communication link on which a single packet may be transmitted during each cycle or a multi-packet communication link on which on which multiple packets may be transmitted during each cycle. For example, the first communication link 161 can be a dual-packet communication link on which zero, one, or two packets can be transmitted during each cycle.

In the implementation shown in FIG. 1, the wireless terminal 100 includes a processor 110 coupled with a memory 120, an input device 130, and an output device 140. The processor may be coupled with a modem 150 and a transceiver 160. The transceiver 160 shown is also coupled with the modem 150 and an antenna 170. The wireless terminal 100 and components thereof may be powered by a battery 180 and/or an external power source. In some implementations, the battery 180, or a portion thereof, is rechargeable by an external power source via a power interface 190. Although described separately, it is to be appreciated that functional blocks described with respect to the wireless terminal 100 need not be separate structural elements. For example, the processor 110 and memory 120 may be implemented in a single chip. Similarly, two or more of the processor 110, modem 150, and transceiver 160 may be implemented in a single chip.

The processor 110 can be a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration.

In the implementation shown in FIG. 1, the processor 110 can be coupled, via one or more buses, with read information from or write information to the memory 120. The processor may additionally, or in the alternative, contain memory, such as processor registers. The memory 120 can include processor cache, including a multi-level hierarchical cache in which different levels have different capacities and access speeds. The memory 120 can also include random access memory (RAM), other volatile storage devices, or non-volatile storage devices. The storage can include hard drives, optical discs, such as compact discs (CDs) or digital video discs (DVDs), flash memory, floppy discs, magnetic tape, and Zip drives.

The processor 110 is also coupled with an input device 130 and an output device 140 configured for, respectively, receiving input from and providing output to, a user of the wireless terminal 100. Suitable input devices may include, but are not limited to, a keyboard, buttons, keys, switches, a pointing device, a mouse, a joystick, a remote control, an infrared detector, a video camera (possibly coupled with video processing software to, e.g., detect hand gestures or facial gestures), a motion detector, or a microphone (possibly coupled with audio processing software to, e.g., detect voice commands). Suitable output devices may include, but are not limited to, visual output devices, including displays and printers, audio output devices, including speakers, headphones, earphones, and alarms, and haptic output devices, including force-feedback game controllers and vibrating devices.

The processor 110 may be coupled with a modem 150 and a transceiver 160. The modem 150 and transceiver 160 may be configured to prepare data generated by the processor 110 for wireless transmission over the communication links 161, 163 via the antenna 170. The modem 150 and transceiver 160 also demodulate data received over the communication links 161, 163 via the antenna 170. In some implementations, the modem 150 and the transceiver 160 may be configured to operate according to one or more air interface standards. The transceiver can include a transmitter 162, a receiver 164, or both. In other implementations, the transmitter 162 and receiver 164 are two separate components. The modem 150 and transceiver 160, can be implemented as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. The antenna 170 can include multiple antennas for multiple-input/multiple-output (MIMO) communication.

The wireless terminal 100 and components thereof may be powered by a battery 180 and/or an external power source. The battery 180 can be any device which stores energy, and particularly any device which stores chemical energy and provides it as electrical energy. The battery 180 can include one or more secondary cells including a lithium polymer battery, a lithium ion battery, a nickel-metal hydride battery, or a nickel cadmium battery, or one or more primary cells including an alkaline battery, a lithium battery, a silver oxide battery, or a zinc carbon battery. The external power source can include a wall socket, a vehicular cigar lighter receptacle, a wireless energy transfer platform, or the sun.

In some implementations, the battery 180, or a portion thereof, is rechargeable by an external power source via a power interface 190. The power interface 190 can include a jack for connecting a battery charger, an inductor for near field wireless energy transfer, or a photovoltaic panel for converting solar energy into electrical energy.

In some implementations, the wireless terminal 100 is a mobile telephone, a personal data assistant (PDAs), a handheld computer, a laptop computer, a wireless data access card, a GPS receiver/navigator, a camera, an MP3 player, a camcorder, a game console, a wrist watch, a clock, or a television.

As shown in FIG. 1, the base station 101 also includes at least a processor 111 coupled with a memory 112 and a transceiver 165. The transceiver 165 includes a transmitter 167 and a receiver 166 coupled with an antenna 171. The processor 111, memory 112, transceiver 165, and antenna 171 can be implemented as described above with respect to the wireless terminal 100.

In the wireless communication system 10 of FIG. 1, the base station 101 can transmit data packets to the wireless terminal 100 via a first communication link 161 and/or a second communication link 163.

Figure 2:
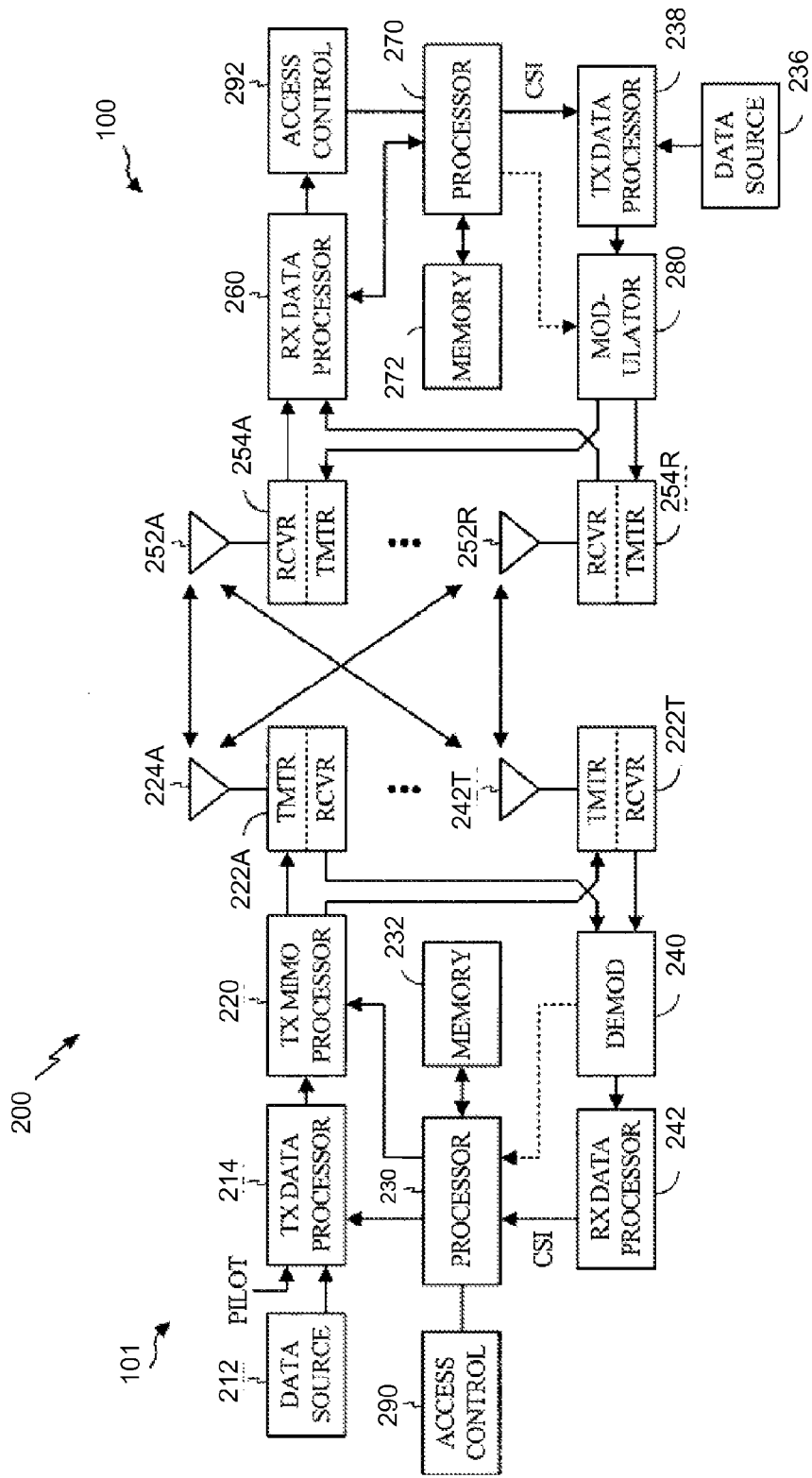
FIG. 2 shows an exemplary functional block diagram of components that may be employed to facilitate communication between communication nodes, such a wireless terminal and a base station.

FIG. 2 shows an exemplary functional block diagram of components that may be employed to facilitate communication between communication nodes, such a wireless terminal and a base station. Specifically, FIG. 2 is a simplified block diagram of a first wireless device 101 (e.g., a base station) and a second wireless device 100 (e.g., a wireless terminal) of a communication system 200. At the first device 101, traffic data for a number of data streams is provided from a data source 212 to a transmit (TX) data processor 214.

In some implementations, each data stream is transmitted over a respective transmit antenna. The TX data processor 214 may be configured to format, code, and interleave the traffic data for each data stream based on a particular coding scheme selected for that data stream.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 230. A data memory 232 may store program code, data, and other information used by the processor 230 or other components of the device 101.

In the implementation shown in FIG. 2, the modulation symbols for some data streams may be provided to a TX MIMO processor 220, which may further process the modulation symbols (e.g., for OFDM). The TX MIMO processor 220 then provides modulation symbol streams to transceivers (XCVR) 222A through 222T. In some aspects, the TX MIMO processor 220 applies beam-forming weights to the symbols of the data streams and to the antenna from which the symbol is being transmitted.

Each transceiver 222 receives and processes a respective symbol stream to provide one or more analog signals, and further conditions (e.g., amplifies, filters, and upconverts) the analog signals to provide a modulated signal suitable for transmission over the channel. Modulated signals from transceivers 222A through 222T are then transmitted from antennas 224A through 224T, respectively.

At the second device 100, the transmitted modulated signals are received by antennas 252A through 252R and the received signal from each antenna 252 is provided to a respective transceiver (XCVR) 254A through 254R. Each transceiver 254 may be configured to condition (e.g., filters, amplifies, and downconverts) a respective received signal, digitizes the conditioned signal to provide samples, and further processes the samples to provide a corresponding "received" symbol stream.

A receive (RX) data processor 165 then receives and processes the received symbol streams from transceivers 254 based on a particular receiver processing technique to provide "detected" symbol streams. The RX data processor 165 then demodulates, deinterleaves, and decodes each detected symbol stream to recover the traffic data for the data stream. The processing by the RX data processor 165 is complementary to that performed by the TX MIMO processor 220 and the TX data processor 214 at the device 101.

The processor 270 formulates an uplink message, which may include various types of information regarding the communication link and/or the received data stream. The reverse link message is then processed by a TX data processor 238, which also receives traffic data for a number of data streams from a data source 236, modulated by a modulator 280, conditioned by the transceivers 254A through 254R, and transmitted back to the device 101.

At the device 101, the modulated signals from the second device 100 are received by the antennas 224, conditioned by the transceivers 222, demodulated by a demodulator (DEMOD) 240, and processed by an RX data processor 242 to extract the uplink message transmitted by the second device 100. The processor 230 then processes the extracted message.

FIG. 2 also illustrates that the communication components may include one or more components that perform access control. For example, an access control component 290 may cooperate with the processor 230 and/or other components of the device 101 to send/receive signals to/from another device (e.g., device 100). Similarly, an access control component 292 may cooperate with the processor 270 and/or other components of the device 100 to send/receive signals to/from another device (e.g., device 101). It should be appreciated that for each device 101 and 100 the functionality of two or more of the described components may be provided by a single component. For example, a single processing component may provide the functionality of the access control component 290 and the processor 230 and a single processing component may provide the functionality of the access control component 292 and the processor 270.

The interface between base stations and wireless terminals may be described by a protocol stack that consists of a number of protocol layers, each giving a specific service to the next layer above and/or below. For example, a top layer of the protocol stack, sometimes referred to as the radio resource control (RRC) layer, may control signaling to control the wireless connection to the wireless terminal. This layer may additionally provide control of aspects of the wireless terminal from the base station and may include functions to control radio bearers, physical channels, mapping of different channel types, measurement and other functions.

To ensure proper handling of data packets transmitted, various protocols may be implemented to allow the wireless terminal and the base station to coordinate data packet transmission. One such protocol used in UMTS is the Radio Link Control (RLC) protocol specified in 3GPP TS 25.322. According to the RLC protocol, a radio link may be configured by the base station to operate in "acknowledged mode (AM)". For example, a data packet transmitted by a wireless terminal may be acknowledged by a base station. The acknowledgement may be transmitted from the base station once the data packet is received at the base station. In some implementations, it may be desirable to transmit acknowledgements from the base station in batches to the wireless terminal. For example, a wireless terminal may transmit an indicator to the base station (e.g., in a header field) indicating a request for acknowledgement of the data packets received by the base station. The rules for transmitting the acknowledgment indicator (poll bit) are configurable by the base station. For example, in some implementations the base station may specify an acknowledgement request frequency period during which the wireless terminal may request acknowledgement of packets received by the base station.

The wireless terminal may compare the acknowledged data packets with a list of data packets transmitted. The wireless terminal may retransmit any data packets that the base station has not acknowledged. In some instances, if a packet has been unsuccessfully retransmitted (e.g., no acknowledgement received) a specified number of times, the wireless terminal may be configured to attempt to reset the communication link with the base station.

The poll request discussed above may be sent in the same packet as a protocol data unit (PDU). This is known in the art as "piggybacking" the poll request with the transmission of the PDU. When there is unsent data at the wireless terminal, the wireless terminal may "piggyback" the poll request when sending the unsent data. If the wireless terminal does not have new data to send, the wireless terminal 100 may still send a poll request to update the status of any unacknowledged PDUs. When sending the poll request, the wireless terminal 100 may have a choice of piggybacking the poll request with one of a plurality of unacknowledged PDUs.

Some protocols may maintain status information for a set of unacknowledged PDUs. As the oldest PDUs are acknowledged, status for those PDUs may no longer be included in the response to the poll request. In other words, the poll response may include status only for the oldest unacknowledged PDUs, along with all the more recently transmitted PDUs up to the PDU specified in the poll request itself.

Some aspects may select the most recently transmitted and unacknowledged PDU to send with the poll request. This approach may meet a protocol requirement to send a poll request. Because the most recently sent PDU is sent with the poll request in these implementations, this approach may not assist in reducing the number of PDUs included in the status response from the base station 100 to the poll request, as the least recently sent but not received or acknowledged PDUs may remain not received. Under conditions when multiple poll requests are sent for a set of unacknowledged PDUs, this implementation may increase the probability that a PDU included in the poll request has previously been received by the base station 101.

Other aspects may select a PDU to include with a poll request based on the PDUs original or first transmission time. For example, these aspects may select an unacknowledged PDU with the oldest original transmission time for the poll request. This implementation may reduce the number of PDUs reported in the status response from the base station, since the base station may report on the oldest unacknowledged PDU and all PDUs up to the current PDU. Under conditions when multiple poll requests are sent for a set of unacknowledged PDUs, this implementation may increase the probability that a particular PDU is sent with a poll request multiple times. This may occur while other unacknowledged PDUs are not sent with a poll request. This may increase the probability that PDUs previously received by a base station 101 are resent in a poll request.

Other implementations may select an unacknowledged PDU based on a most recent transmission time for the PDU. In some aspects, the unacknowledged PDU with the oldest most recent transmission time may be selected. The selected PDU's most recent transmission time may then be updated when the PDU is retransmitted based on the retransmission time.

Other implementations may maintain a PDU index to determine which PDU to select for a poll request. For example, some implementations may initialize a PDU index to zero. When selecting a PDU to include with a poll request, an implementation may select a PDU based on the index. For example, an implementation may order unacknowledged PDUs in the order of their original transmission time. A PDU may be selected by indexing into the ordered list with the PDU index. For example, in one aspect, when the index is zero, the oldest unacknowledged PDU is selected. When the index is one, the second oldest PDU is selected. After a PDU is selected, the PDU index is incremented.

There may be a maximum PDU index. When the PDU index reaches a maximum PDU index, the index may be reset to zero. The maximum PDU index may be set to the number of unacknowledged PDUs. The maximum index may also be adjusted as the number of unacknowledged PDUs changes.

Other implementations may order the unacknowledged PDUs in reverse order of their original transmission time. A PDU may then be selected by indexing into the reverse ordered list with the PDU index. After a PDU is selected from the reverse ordered list, the index may be incremented. When the index reaches the maximum PDU index, the index is reset to zero. Note that other implementations could decrement an index instead of incrementing an index as described above.

Figure 3:
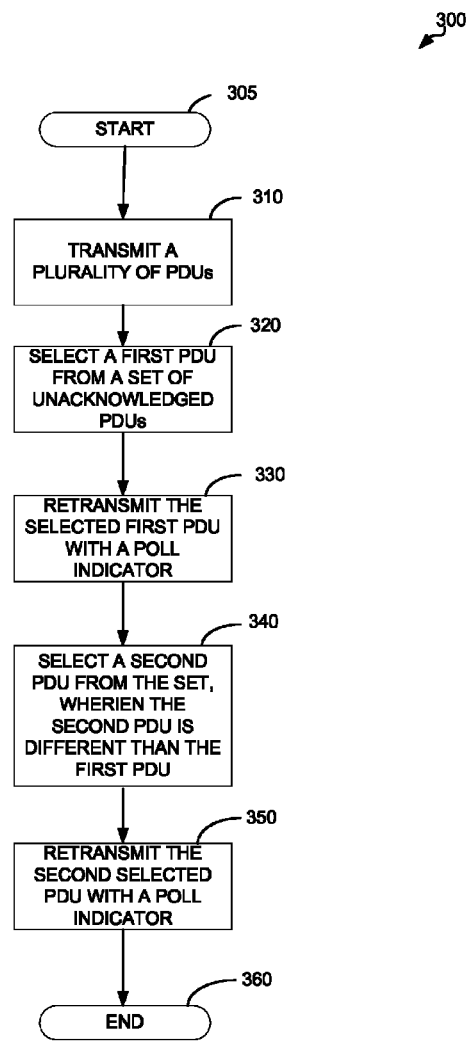
FIG. 3 shows an exemplary flowchart illustrating an implementation of a method of wireless condition based communication in a wireless terminal.

FIG. 3 shows an exemplary flowchart illustrating an implementation of a method of retransmitting a set of unacknowledged PDUs in a wireless terminal. The method 300 begins at start block 302 and then moves to block 310 where a plurality of PDUs is transmitted. The PDUs may be transmitted, for example, from a wireless terminal 100 to a base station 101. Process 300 then moves to block 320, where a PDU from a set of unacknowledged PDUs is selected. As described earlier, in some aspects, the PDU with the oldest original retransmission time may be selected. In other aspects, the PDU with the oldest most recent transmission time may be selected. In still other aspects, an ordered or reverse ordered list of unacknowledged PDUs may be maintained, with a PDU index used to select a PDU from the list.

Process 300 then moves to block 330, where the selected PDU is retransmitted with a poll request. Process 300 then moves to block 340, where a second PDU from the set of unacknowledged PDUs is selected. The second PDU is different than the first PDU selected in block 320. Similar to block 330, how the PDU is selected may vary by implementation Implementations may select a PDU based on its original transmission time, most recent transmission time, or based on a PDU index and an ordered or reverse ordered list of unacknowledged PDUs. In one aspect, the PDU index may be altered in block 340 before the second PDU is selected. For example, it may be incremented or decremented. The value of the PDU index may then be different when processing block 340 is performed as compared to the PDU index value when processing block 320 is performed. Process 300 then moves to block 350, where the second selected PDU is retransmitted with a poll request. Process 300 then moves to end state 360.

Figure 4:
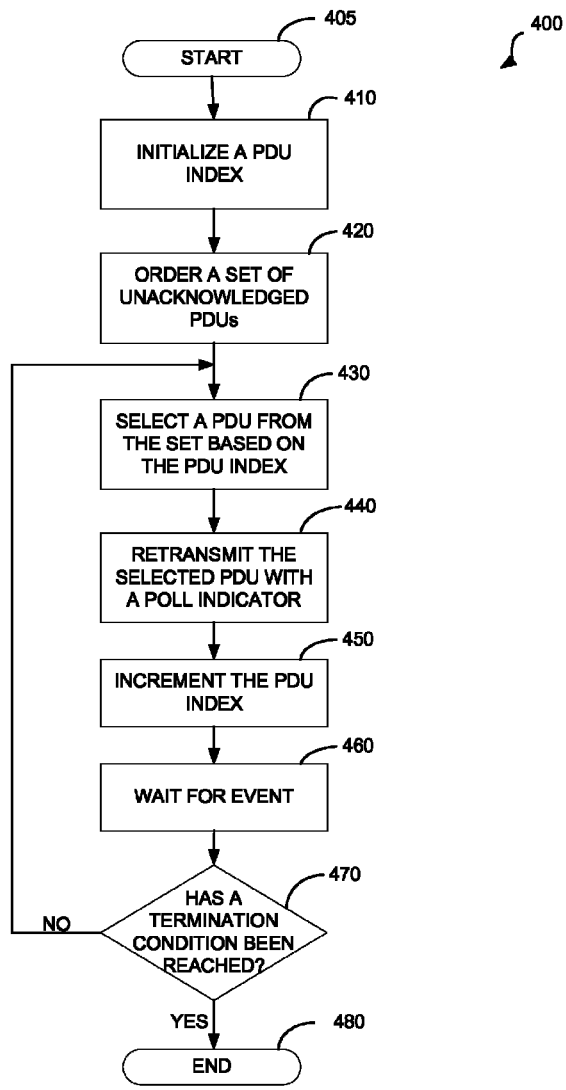
FIG. 4 shows an exemplary flowchart illustrating an implementation of a method of selecting and retransmitting unacknowledged protocol data units in a wireless terminal

FIG. 4 shows an exemplary flowchart illustrating an implementation of a method of selecting and retransmitting unacknowledged PDUs in a wireless terminal. Portions of process 400 may be implemented, in some aspects, in blocks 320, 330, 340, and 350 of process 300, illustrated in FIG. 3. Process 400 begins at start state 405 and then moves to block 410 where a PDU index is initialized. Process 400 then moves to block 420, where a set of unacknowledged PDU's are ordered. As described earlier, the PDU's may be ordered by their original transmission times. In some aspects, the order may be from earliest original transmission time to latest original transmission time. In other aspects, the order may be reversed. Other aspects may randomize the order.

Still other aspects may order the PDU's based on their most recent transmission time. Some of these aspects may order the PDUs from the earliest most recent transmission time to the least recent transmission time. Other aspects may reverse the order. Still other aspects may randomize the order.

Process 400 then moves to block 430, where a PDU is selected based on the ordered set and the PDU index. For example, the ordered list may be implemented as an array, with the PDU index used to index into the array to select the PDU from the array. Process 400 then moves to block 440, where the selected PDU is retransmitted with a poll indicator. Process 400 then moves to block 450 where the PDU index is incremented. Other aspects may decrement the PDU index. Process 400 then moves to block 460 where process 400 waits for an event. In some aspects, the event may be the expiration of a retransmission timer. In other aspects, the event may be a reset event for the wireless connection. In other aspects, the event may be a device power down event or a device event indicating that wireless communications should cease. In some aspects, the event may be an acknowledgement of one or more PDUs from a base station, such as base station 101 illustrated in FIG. 2.

After the event occurs, process 400 moves to decision block 470, where an evaluation is performed as to whether process 400 should terminate. Process 400 may terminate in some aspects when the device power down or wireless communications events are received. Some aspects may terminate process 400 when all PDU's in the ordered set of PDUs are acknowledged by the base station 101. If decision block 470 determines process 400 should terminate, process 400 moves to end block 480. If decision block 470 determines process 400 should not terminate, process 400 returns to block 430 and process 400 repeats from block 430.

Figure 5:
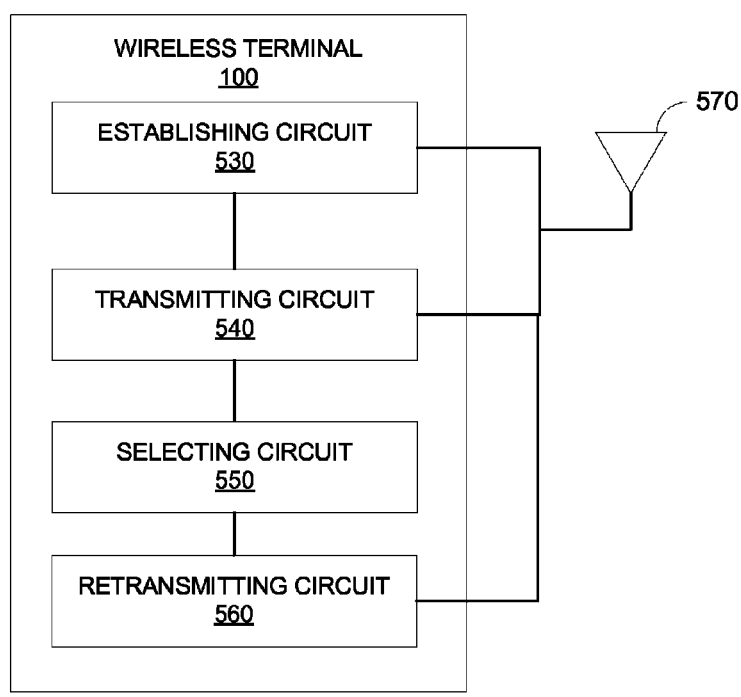
FIG. 5 shows an exemplary functional block diagram of a different wireless terminal.

FIG. 5 shows an exemplary functional block diagram of another wireless terminal. Those skilled in the art will appreciate that a wireless terminal may have more components than the simplified wireless terminal 100 illustrated in FIG. 5. The wireless terminal 100 includes only those components useful for describing some prominent features of implementations within the scope of the claims. Wireless terminal 100 includes an establishing circuit 530, a transmitting circuit 540, a selecting circuit 550, a retransmitting circuit 560, and an antenna 570. In one implementation the establishing circuit 530 is configured to establish a wireless communication link. In one implementation, means for establishing includes an establishing circuit 430. In one implementation, the transmitting circuit 540 is configured to transmit a plurality of PDUs. In some implementations, the means for transmitting includes a transmitting circuit 540. The selecting circuit 550 may select a PDU for retransmission from a set of unacknowledged PDUs. In one implementation, means for selecting includes a selecting circuit. The retransmitting circuit 560 may retransmit data, including PDUs with a polling bit, to a base station via the antenna 560. In one implementation, means for retransmitting includes a retransmitting circuit 560.

A wireless terminal may include, be implemented as, or known as user equipment, a subscriber station, a subscriber unit, a mobile station, a mobile phone, a mobile node, a remote station, a remote terminal, a user terminal, a user agent, a user device, or some other terminology. In some implementations a wireless terminal may include a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

A base station may include, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), or some other similar terminology.

In some aspects a base station may include an access node for a communication system. Such an access node may provide, for example, connectivity for or to a network (e.g., a wide area network such as the Internet or a cellular network) via a wired or wireless communication link to the network. Accordingly, a base station may enable another node (e.g., a wireless terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless terminal or node may communicate via one or more wireless communication links that are based on or otherwise support any suitable wireless communication technology. For example, in some aspects a wireless terminal may associate with a network. In some aspects the network may include a local area network or a wide area network. A wireless terminal may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless terminal may support or otherwise use one or more of a variety of corresponding modulation or multiplexing schemes. A wireless terminal may thus include appropriate components (e.g., air interfaces) to establish and communicate via one or more wireless communication links using the above or other wireless communication technologies. For example, a wireless terminal may include a wireless transceiver with associated transmitter and receiver components that may include various components (e.g., signal generators and signal processors) that facilitate communication over a wireless medium.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may include one or more elements.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit (IC), a wireless terminal, or a base station. The IC may include a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blue-ray disc where disks usually reproduce data magnetically, while discs reproduce data optically with lasers. Combinations of the above should also be included within the scope of computer-readable media. In summary, it should be appreciated that a computer-readable medium may be implemented in any suitable computer-program product.

The above description is provided to enable any person skilled in the art to make or use implementations within the scope of the appended claims. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A device configured to communicate via a wireless communication link, the device comprising a processor, configured to:
    transmit a plurality of protocol data units (PDUs) to a receiving device,
    order a set of PDUs that have not been acknowledged by the receiving device,
    select a first PDU from the set based on the ordered set and a PDU index, the PDU index being a number assigned to the PDUs that have not been acknowledged by the receiving device,
    retransmit the first selected PDU with a first poll indicator,
    alter the PDU index to an altered PDU index,
    select a second PDU from the set, based on the ordered set and the altered PDU index, wherein the second PDU is different than the first PDU, and
    retransmit the second selected PDU with a second poll indicator.

2. The device of claim 1, wherein the PDUs are selected based on the PDUs' original transmission time.

3. The device of claim 1, wherein the PDUs are selected based on the PDUs' most recent transmission time.

4. The device of claim 1, wherein the unacknowledged PDUs are ordered from least recent transmission time to most recent transmission time, and altering the PDU index comprises incrementing the PDU index.

5. The device of claim 1, wherein the unacknowledged PDUs are ordered from most recent transmission time to least recent transmission time, and altering the PDU index comprises decrementing the PDU index.

6. The device of claim 1, wherein the unacknowledged PDUs are randomly ordered.

7. The device of claim 1, wherein the selecting is in response to the expiration of a timer.

8. The device of claim 1, wherein the retransmitting is in response to the expiration of a timer.

9. The device of claim 1, wherein the processor is further configured to transmit a second plurality of PDUs to the receiving device, and add the second plurality of PDUs to the set of PDUs that has not been acknowledged by the receiving device.

10. The device of claim 1, wherein at least one of the first and second poll indicators comprises a bit in a packet header field.

11. The device of claim 1, wherein the wireless communication link comprises a universal mobile telecommunication system.

12. The device of claim 1, wherein the wireless communication link comprises a 3G system.

13. A method of wireless communication, comprising:
    transmitting a plurality of PDUs to a receiving device;
    ordering a set of PDUs that have not been acknowledged by the receiving device;
    selecting a first PDU from the set based on the ordered set and a PDU index, the PDU index being a number assigned to the PDUs that have not been acknowledged by the receiving device;
    retransmitting the first selected PDU with a first poll indicator;
    altering the PDU index to an altered PDU index;
    selecting a second PDU from the set, based on the ordered set and the altered PDU index, wherein the second PDU is different than the first PDU; and
    retransmitting the second selected PDU with a second poll indicator.

14. The method of claim 13, wherein the PDUs are selected based on the PDUs' original transmission time.

15. The method of claim 13, wherein the PDUs are selected based on the PDUs' most recent transmission time.

16. The method of claim 13, wherein the set of PDUs is ordered from most recently transmitted to least recently transmitted, and altering the PDU index comprises incrementing the PDU index.

17. The method of claim 13, wherein the set of PDUs is ordered from least recently transmitted to most recently transmitted, and altering the PDU index comprises decrementing the PDU index the PDU index.

18. The method of claim 13, wherein the set of PDUs is randomly ordered.

19. The method of claim 13, wherein the set of PDUs is ordered based on the PDU's original transmission time.

20. The method of claim 13, wherein the selecting is in response to the expiration of a timer.

21. The method of claim 13, wherein the retransmitting is in response to the expiration of a timer.

22. The method of claim 13, further comprising:
    transmitting a second plurality of PDUs to the receiving device; and
    adding the second plurality of PDUs to the set of PDUs that have not been acknowledged by the receiving device.

23. The method of claim 13, wherein at least one of the first and second poll indicators comprises a bit in a packet header field.

24. A device configured to communicate via a wireless communication link, the device comprising:
    means for transmitting a plurality of PDUs to a receiving device;
    means for ordering a set of PDUs that have not been acknowledged by the receiving device;

means for selecting a first PDU from the set based on the ordered set and a PDU index, the PDU index being a number assigned to the PDUs that have not been acknowledged by the receiving device;

means for retransmitting the first selected PDU with a first poll indicator;

means for altering the PDU index to an altered PDU index;

means for selecting a second PDU from the set, based on the ordered set and the altered PDU index, wherein the second PDU is different than the first PDU; and means for retransmitting the second selected PDU with a second poll indicator.

25. The device of claim 24, wherein the means for selecting are configured to select the PDUs based on the PDU's original transmission times.

26. The device of claim 24, wherein the means for selecting are configured to select the PDUs based on the PDU's most recent transmission times.

27. The device of claim 24, wherein the ordered list of unacknowledged PDUs is ordered from least recently transmitted to most recently transmitted, and altering the PDU index comprises incrementing the PDU index.

28. The device of claim 24, wherein the ordered list of unacknowledged PDUs is ordered from most recently transmitted to least recently transmitted, and altering the PDU index comprises decrementing the PDU index.

29. The device of claim 24, wherein the means for selecting is configured to select a PDU in response to the expiration of a timer.

30. The device of claim 24, wherein the means for retransmitting is configured to retransmit a PDU in response to the expiration of a timer.

31. A non-transitory computer readable storage medium comprising instructions that, when executed by a processor of an apparatus, cause the apparatus to:

transmit a plurality of PDUs to a receiving device;

order a set of PDUs that have not been acknowledged by the receiving device select a first PDU from the set based on the ordered set and a PDU index, the PDU index being a number assigned to the PDUs that have not been acknowledged by the receiving device;

retransmit the first selected PDU with a first poll indicator;

alter the PDU index to an altered PDU index;

select a second PDU from the set, based on the ordered set and the altered PDU index, wherein the second PDU is different than the first PDU; and retransmit the second selected PDU with a second poll indicator.

32. The computer readable storage medium of claim 31, wherein the PDUs are selected based on the PDUs' original transmission time.

33. The computer readable storage medium of claim 31, wherein the PDUs are selected based on the PDUs' most recent transmission time.

34. The computer readable storage medium of claim 31, wherein the unacknowledged PDUs are ordered from least recent transmission time to most recent transmission time, and altering the PDU index comprises incrementing the PDU index.

35. The computer readable storage medium of claim 31, wherein the unacknowledged PDUs are ordered from most recent transmission time to least recent transmission time, and altering the PDU index comprises decrementing the PDU index.

36. The computer readable storage medium of claim 31, wherein the unacknowledged PDUs are randomly ordered.

37. The computer readable storage medium of claim 31, wherein the selecting is in response to the expiration of a timer.

38. The computer readable storage medium of claim 31, wherein the retransmitting is in response to the expiration of a timer.

39. The computer readable storage medium of claim 31, further comprising instructions that, when executed by a processor of an apparatus, cause the apparatus to:

transmit a second plurality of PDUs to the receiving device, and add the second plurality of PDUs to the set of PDUs that has not been acknowledged by the receiving device.

40. The computer readable storage medium of claim 31, wherein at least one of the first and second poll indicators comprises a bit in a packet header field.

* * * * *